United States Patent
Planta Torralba et al.

(10) Patent No.: US 8,734,144 B2
(45) Date of Patent: May 27, 2014

(54) DEVICE FOR SELECTIVELY DEPOSITING MOLTEN PLASTIC MATERIALS

(75) Inventors: Francisco Javier Planta Torralba, Barcelona (ES); Francesco Puliga, Barcelona (ES); Jorge Ribatallada Diez, Cerdanyola del Vallès (ES)

(73) Assignee: Fundacio Privada Ascamm (ES)

( * ) Notice: Subject to any disclaimer, the term of this patent is extended or adjusted under 35 U.S.C. 154(b) by 297 days.

(21) Appl. No.: 13/386,341

(22) PCT Filed: Jul. 21, 2010

(86) PCT No.: PCT/IB2010/001768
§ 371 (c)(1),
(2), (4) Date: Jan. 25, 2012

(87) PCT Pub. No.: WO2011/010213
PCT Pub. Date: Jan. 27, 2011

(65) Prior Publication Data
US 2012/0121748 A1  May 17, 2012

(30) Foreign Application Priority Data
Jul. 21, 2009  (EP) .................................... 09075324

(51) Int. Cl.
*B29C 35/08* (2006.01)
(52) U.S. Cl.
USPC .................... 425/174.2; 425/382.4; 425/461
(58) Field of Classification Search
USPC ................... 425/174, 2, 382.4, 461
See application file for complete search history.

(56) References Cited

U.S. PATENT DOCUMENTS

| | | | |
|---|---|---|---|
| 3,203,215 A * | 8/1965 | Jones | 72/253.1 |
| 3,443,059 A | 5/1969 | Spencer | |
| 3,464,102 A | 9/1969 | Soloff | |
| 3,619,429 A * | 11/1971 | Torigai et al. | 264/433 |
| 4,496,101 A * | 1/1985 | Northman | 239/102.2 |
| 6,036,467 A | 3/2000 | Jameson | |
| 2002/0019683 A1 | 5/2003 | Hiroshi et al. | |

FOREIGN PATENT DOCUMENTS

| | | |
|---|---|---|
| DE | 4103740 A1 | 8/1992 |
| EP | 0426363 A2 | 8/1991 |
| FR | 2565131 A1 | 6/1985 |
| SU | 570496 A1 | 8/1977 |
| WO | 2004/024415 | 3/2004 |
| WO | 2009/030791 A1 | 3/2009 |
| WO | 2011/010213 A2 | 1/2011 |

* cited by examiner

*Primary Examiner* — James Sanders
(74) *Attorney, Agent, or Firm* — Hess Patent Law Firm LLC; Robert J. Hess

(57) ABSTRACT

It comprises a support (3), an ultrasonic transducer (1), a sonotrode (2), a nozzle (4), at an end part of said sonotrode, and a melting chamber (5) in communication with a deposition outlet (4a) through a discharging channel (6a) wherein:
an internal channel (6) extends through the sonotrode (2) allowing a loose passage of plastic material in solid state;
said internal channel (6) extends along a section with a progressive reduction of its clearance area through a truncated conical section providing said discharging channel (6a) and containing said melting chamber (5);
several longitudinal profiles or ribs (10), located as a cone generator and angularly offset are protruding from the interior wall of the conical section of the melting chamber (5), having a multifaceted end (11) facing and opposed to an entrance to said melting chamber (5).

15 Claims, 4 Drawing Sheets

DEVICE FOR SELECTIVELY DEPOSITING MOLTEN PLASTIC MATERIALS

BACKGROUND OF THE INVENTION

The present invention relates to a device for selectively depositing molten plastic materials. In particular it refers to a device in which the plastic material is fed in general in solid state and then melted before being discharged.

STATE OF THE ART

In the art are known apparatus for depositing molten plastic material.

WO 2004/024415 discloses an apparatus for improving the flow characteristics of injection moulding or extrusion material. The apparatus comprise a flow path through which a material to be injection moulded or extruded passes in use, and an ultrasonic vibration device, comprising a sonotrode, arranged for direct contact with material passing through the flow path in use, for directly vibrating the material as it is being injected or extruded.

U.S. Pat. No. 6,036,467 describes an apparatus for the melt extrusion of a thermoplastic polymer in which ultrasonic energy is utilized in the melt-extrusion process. The apparatus comprises a die housing and means for applying ultrasonic energy to a portion of the molten thermoplastic polymer. The die housing defines a chamber adapted to receive the molten thermoplastic polymer, an inlet orifice for supplying the chamber with molten polymer and an extrusion orifice.

Both the apparatus disclosed above have as drawback the fact of imposing the use of molten thermoplastic polymer as starting material, i.e. the plastic material fed to the device, and then to the chamber, is already in a molten phase suitable to be injected or extruded.

US2002019683 discloses a machine tool combining material addition via ultrasonic object consolidation and subtractive techniques for imparting high-dimensional accuracy to a finished object.

The same applicant filed the application WO 2009/030791 regarding a device for depositing molten plastic material in which the plastic material is fed in solid phase. The device comprises a hollow casing provided with a melting chamber, a sonotrode housed in the hollow part of the casing and in contact with said melting chamber, an inlet passage for the plastic material in solid phase and an outlet opening for depositing molten plastic. The plastic material is fed to the molten chamber by means of screw barrel pushing the material through the hollow casing.

In spite of a good operation, the device of WO 2009/030791 has some disadvantages that are following detailed:

the plastic material, even if it is in solid state, needs to be pressed through the length of the casing by means of a screw barrel, thus meaning to have a thread internal to said housing; moreover the presence of a thread makes the device less stiff during the sonotrode vibration;

to insert a screw barrel inside the chamber imposes a difficult construction and associated costs;

the melting chamber is created in the housing and it is wide (extending along the axis of the chamber surrounding the sonotrode), thus not allowing all the material to be subjected to the maximum amplitude of vibration;

the melting chamber, in which the material is subjected to vibration, is not in direct connection with the discharging molten plastic opening; and the melting chamber is not close to the discharging molten plastic opening, thus allowing possible solidification of molten plastic material before said material is discharged through the outlet.

Other prior art devices known in the art are disclosed in DE 41 03 740 and SU 570496.

The present invention addresses some of the problems and difficulties discussed above by providing an improved device for the melt extrusion of thermoplastic material.

SUMMARY OF THE INVENTION

This device comprises a support, an ultrasonic transducer, a sonotrode, a nozzle and a melting chamber in communication with a deposition outlet.

As per the features of this invention the sonotrode is provided with an internal channel passing through its complete length. The diameter of said channel is such as to allow the plastic material to pass through it loosely without friction with its lateral walls till the material reaches the melting chamber.

The plastic material, in the form of a filament, pellets or alike goes through the sonotrode internal channel that therefore acts as a guide for the material for reaching the melting chamber.

The solid phase plastic material is fed to the device through an inlet opening by means of an impeller with a motor that apply a force to the plastic material in order to push it through the sonotrode channel continuously till it reaches the melting chamber.

In the melting chamber the maximum friction force is produced between the filament or alike and the melting chamber walls, thus leading to the fusion of the plastic material.

As a matter of fact the sonotrode vibrates due to the transducer, and those vibrations have the maximum amplitude in last part of the sonotrode, i.e. in the melting chamber.

When the plastic filament or alike, pushed in the sonotrode internal channel by means of the impeller, reaches the melting chamber said filament is pressed against the chamber walls due to the reduction of the melting chamber cross section from its inlet opening towards its outlet opening. At the same time the plastic material in said melting chamber is subjected to the maximum amplitude of the ultrasonic waves.

Therefore the applied force of the motor of the impeller and the amplitude of the sonotrode vibrations are the two parameters controlling the process and that influence the fusion temperature, thus allowing the use of different plastic materials with different fusion temperatures.

In order to minimize the starting time of the process a system for controlling the temperature of the deposition outlet is provided. Said temperature controlling system can be external or internal.

The external temperature controlling system is based on a group of resistances with which the device will be in contact, only at the beginning of the process, to heat up the deposition outlet of said device.

The internal temperature controlling system comprises resistances integrated in the device, preferably at the end part of the sonotrode, in order to regulate the temperature automatically.

In order to avoid overheating and then stopping of the device operation, an internal or external cooling system is provided. An internal cooling is performed in an example of execution by means of compressed air forced through the same internal channel used to feed the plastic material to the melting chamber.

A device for selectively depositing molten plastic materials comprises a support, an ultrasonic transducer, a sonotrode, a nozzle, integral at an end part of said sonotrode, opposite to the transducer, and a melting chamber in communication with a deposition outlet through a discharging channel wherein:

said melting chamber is placed at the end part of said sonotrode;

an internal channel is provided extending at least in part through said sonotrode allowing the passage of plastic material in solid state (F) fed therethrough towards said melting chamber.

According to the proposal of this invention:

a) said internal channel has a cross section allowing a loose passage of the plastic material in solid state;

b) the internal channel extends along a section with a progressive reduction of its clearance area through a truncated conical section providing the discharging channel leading to said deposition outlet and containing within the melting chamber;

c) the angle of said truncated conical section is chosen in order the plastic material in solid state reaches a point of the interior wall of said frustum conical section in the proximity (about 1-3 mm) of said deposition outlet d) the melting chamber of a truncated cone shape is located at the end part of the sonotrode and extends from the point of contact of the plastic material in solid state with the interior wall of the conical section to approximately said deposition outlet; and e) at least two longitudinal profiles or ribs, located as a cone generator and angularly offset are protruding from the interior wall of the conical section corresponding to the melting chamber area, having a multifaceted end facing and directly opposed to the entrance to said melting chamber of the plastic material.

The number of longitudinal protruding profiles within the melting chamber in a preferred embodiment will be of four members equally angularly spaced although that number may be higher or lower.

The cited multifaceted end of each of said longitudinal protruding profiles is a polyhedron that in a preferred embodiment is a pyramid with at least one edge directly opposite to the entrance of the plastic material in solid state to said melting chamber.

Other features of the invention will appear in the following detailed description of some embodiments of the invention, by way of example only, with reference to the accompanying drawings.

DETAILED DESCRIPTION OF SOME EMBODIMENTS OF THE INVENTION

Figure 1A:
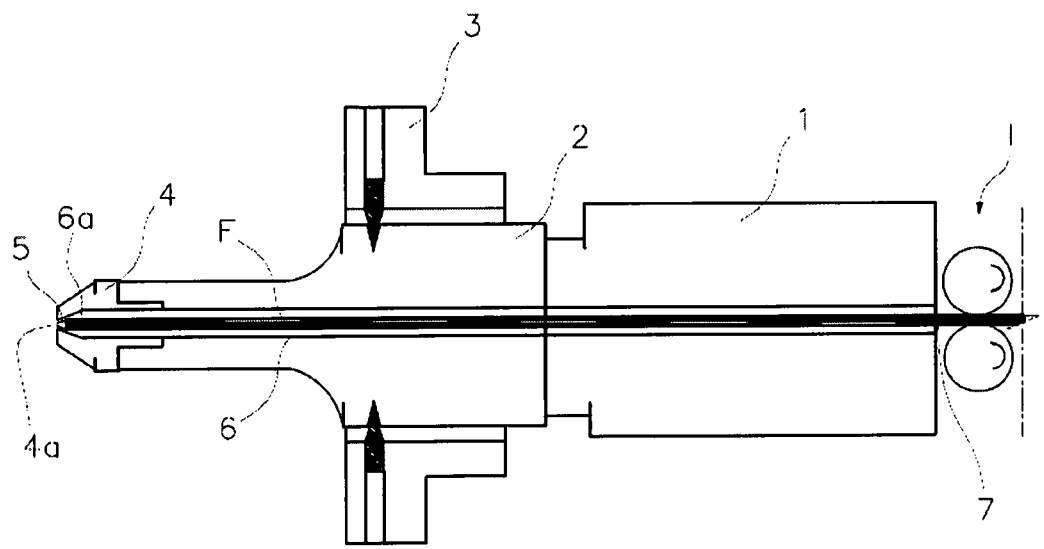
FIGS. 1a and 1b are a schematic cross-sectional and side view of the device respectively in accordance with a first embodiment, in which a detachable nozzle is connected to the sonotrode by means of an internal thread.
Figure 1B:
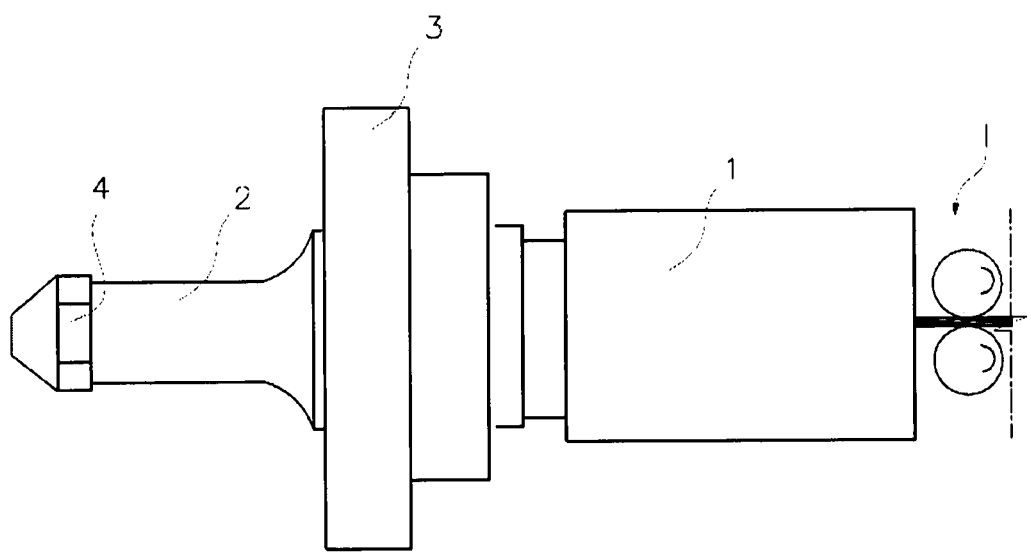

In FIGS. 1a and 1b a first preferred embodiment of the device according to the invention is shown, in which the device comprises an impeller (I) with a motor, an inlet opening (7) for the solid plastic material F, a support (3), an ultrasonic transducer (1), a sonotrode (2), a nozzle (4), integral at the end part of said sonotrode opposite to the transducer (1), and a melting chamber (5) formed within a discharging channel (6a) leading to a deposition outlet (4a).

In said preferred first embodiment, the support (3) takes the sonotrode (2) in place while the transducer (1) is in action. The plastic material (F) in form of filament, pellets or alike are fed into the device through an inlet opening (7) by means of an impeller (I) system, motor operated through said internal channel (6).

The plastic material (F) is then pushed along an internal channel (6) running through the complete length of the device, thus passing through the transducer (1), the sonotrode (2) and the nozzle (4) till the melting chamber (5), placed at the end part of said sonotrode, where the material is melted.

In this preferred first embodiment said internal channel (6) extends along all the length of the sonotrode (2) and has a cross section within the range of 1 and 5 mm in diameter, preferably within the range of 2.2 and 3.1 mm in diameter.

In other embodiments said internal channel (6) can extend also only along a part of said sonotrode (2) for example all the length of all the assembly ultrasonic transducer 1 and sonotrode 2.

The internal channel 6 is preferably centred with regard to at least the length of the sonotrode.

Figure 2A:
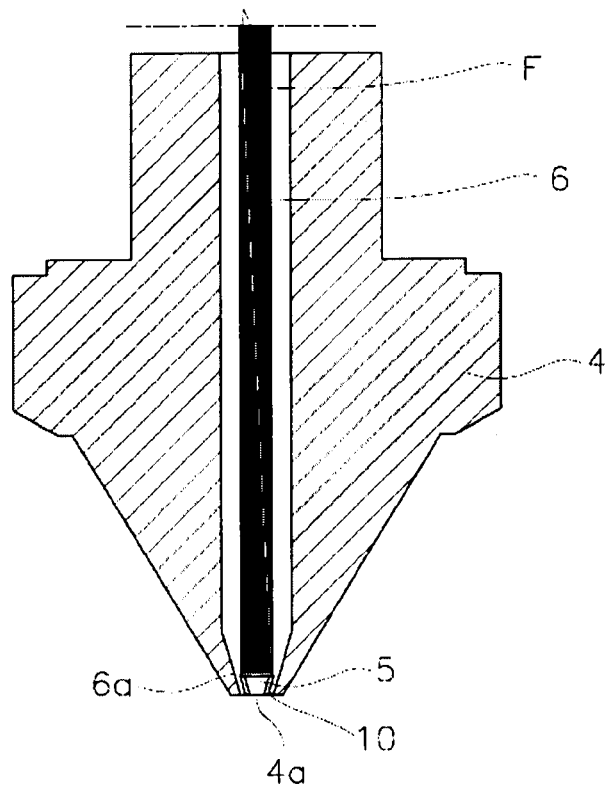
FIGS. 2a and 2b are a cross-sectional and a top view of the portion of a sonotrode nozzle integrating the melting chamber, indicating the point of contact of the plastic material in solid state with the interior wall of a conical section where several longitudinal protruding profiles, equally angularly spaced are located.
Figure 2B:
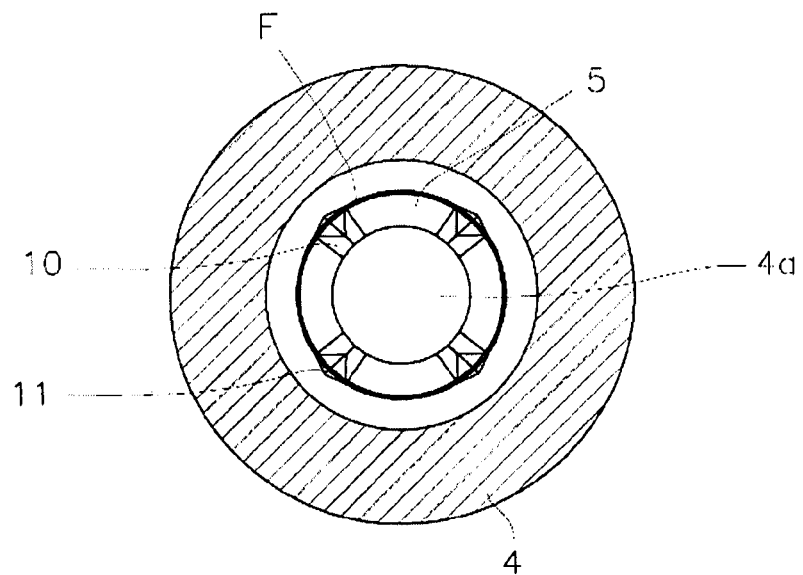

In FIGS. 2a and 2b the main features of this invention related to the construction of the melting chamber 5 are disclosed.

FIG. 2a shows that the internal channel 6 has a passage with a cross section allowing a loose passage of the plastic material in solid state F (within a range of 1 and 5 mm in diameter in the preferred embodiments) that is pushed by the action of the impeller I against a terminal part of the channel 6, where said internal channel 6 extends along a section with a progressive reduction of its clearance area through a truncated conical section providing a discharging channel 6a leading to a deposition outlet 4a and containing within said melting chamber 5.

As clearly visible in FIG. 2a, the angle of the truncated conical section providing said discharging channel 6a is chosen in order that the plastic material in solid state F reaches a point of the interior wall of said frustum conical section in the proximity (a value of around 1 to 3 mm can be suitable) of said deposition outlet 4a and the melting chamber 5 of a truncated cone shape extends from this point of contact of the plastic material in solid state F with the interior wall of the conical section to approximately said deposition outlet. Angles from 83° to 81° of the truncated conical section of the channel 6a have been tested with good results.

As better seen in FIG. 2b, four equally angularly spaced longitudinal profiles or ribs 10, located as cone generators, are protruding from said interior wall of the conical section corresponding to the melting chamber 5 area, and each of said profiles 10 has a multifaceted end 11 facing and directly opposed to the entrance to said melting chamber 5, of the plastic material. Therefore the plastic material in solid state F first touches said multifaceted ends 11 (see the circle of FIG. 2b representing the contour of the plastic material F) including a polyhedron configuration with edges directly opposite to said entrance. The profiles 10 end close to said deposition outlet 4a.

The longitudinal protruding profiles 10 behave in this way as a energy directors and contribute to transfer to the material points of maximum concentration of pressure and of amplitude where the process of fusion of the plastic material, in particular a polymer, initiates, and then the melting chamber provides a complete fusion avoiding any backward motion of the fused material in the discharging channel 6a or chamber 5.

In the embodiment of FIGS. 2a and 2b the polyhedral configuration 11 of the ends of the profiles 10 is a pyramid with at least one edge directly opposite to the entrance of the plastic material in solid state F to the melting chamber 5.

Figure 3:
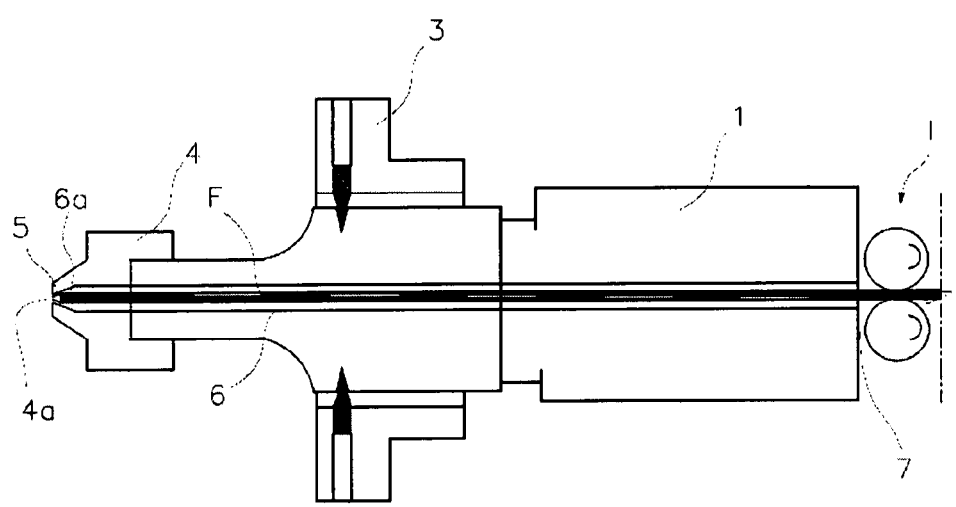
FIG. 3 is a schematic cross-sectional of the device in accordance with a second embodiment, in which the detachable nozzle is connected to the sonotrode by means of an external thread.
Figure 4A:
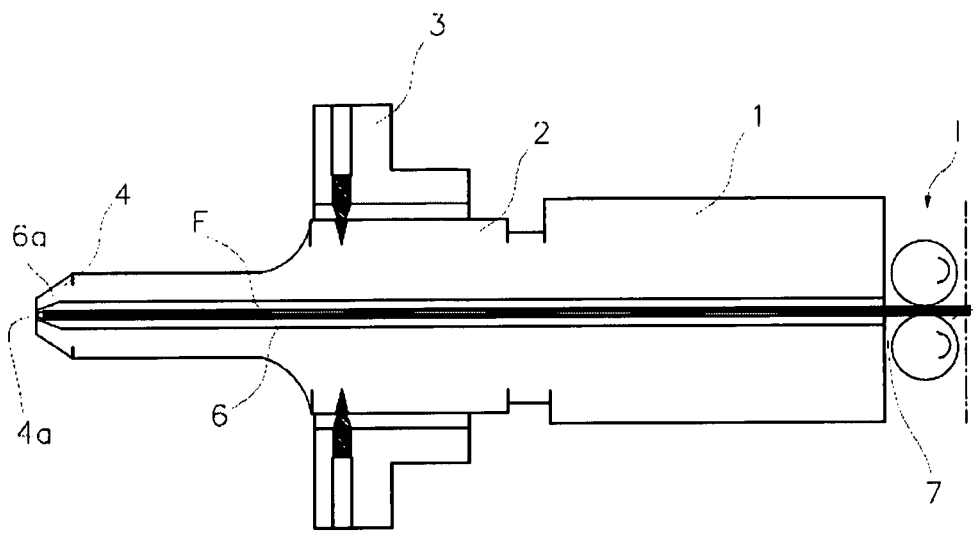
FIGS. 4a and 4b are a schematic cross-sectional and side view of the device in accordance with a third embodiment, in which the nozzle and the sonotrode are in one single piece.
Figure 4B:
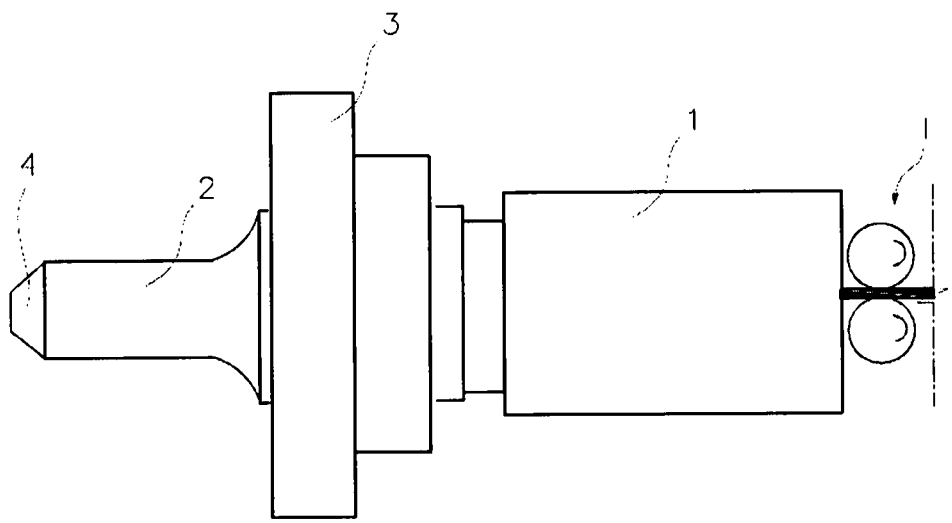

Nozzle 4 and sonotrode 2 can be connected by means of a thread and said thread connection can be internal (FIG. 1a) or external (FIG. 3) to the final part or nozzle 4 of the sonotrode 2.

The nozzle 4 being connected with the sonotrode 2 by means of a thread allows the nozzle 4 to be detached and cleaned when necessary. Moreover a detachable nozzle gives the possibility to change the opening cross section or deposition outlet (4a) through which the molten plastic material flows The material of the nozzle 4 is selected among aluminium, steel and titanium and its alloys, preferably it is aluminium.

In an alternative embodiment illustrated in FIGS. 2a and 2b and FIGS. 4a and 4b the sonotrode 2 is monolithic, i.e. nozzle 4 and sonotrode 2 are one single piece and its material is selected among titanium, steel and aluminium and its alloys, preferably it is titanium.

In this third embodiment the nozzle 4 is integrated in the sonotrode 2, i.e. the nozzle 4 is a single piece together with the sonotrode (2). Therefore the melting chamber 5 is in the sonotrode itself.

The material of this monolithic sonotrode is selected among titanium, steel and aluminium and its alloys, All the embodiments of the device according to the invention are provided with a temperature controlling system comprising an arrangement for controlling the temperature of the sonotrode, said arrangement being internal or external.

Said temperature controlling system can be external or internal:
the external temperature controlling system is based on a group of resistances with which the end part of the device, namely the deposition outlet, is put in contact, only at the beginning of the process, for being heated up.
the internal temperature controlling system comprises resistances integrated in the device, preferably at the end part of the sonotrode, in order to automatically set the temperature.

The device is also provided with an internal cooling system by means of compressed air forced through the same internal channel used to feed the plastic material to the melting chamber and means can also be arranged around the end part of the nozzle (for example annular tubes surrounding the nozzle with openings providing cool air under pressure against said nozzle) including the melting chamber in order to reduce the temperature of the melting chamber and suitably protect the sonotrode.

The invention claimed is:
1. A device for selectively depositing molten plastic materials comprising a support (3), an ultrasonic transducer (1), a sonotrode (2), a nozzle (4), integral at an end part of said sonotrode (2), opposite to the transducer, and a melting chamber (5) in communication with a deposition outlet (4a) through a discharging channel (6a) wherein:
said melting chamber (5) is placed at the end part of said sonotrode;
an internal channel (6) is provided extending at least in part through said sonotrode allowing the passage of plastic material in solid state (F) fed therethrough towards said melting chamber (5); wherein:
a) said internal channel (6) has a cross section that allows a loose passage of said plastic material in solid state (F);
b) said internal channel (6) extends along a section with a progressive reduction of its clearance area through a truncated conical section providing said discharging channel (6a) leading to said deposition outlet (4a) and containing within said melting chamber (5); c) the angle of said truncated section is chosen in order that the plastic material in solid state (F) reaches a point of the interior wall of said frustum conical section in the proximity of said deposition outlet (4a); d) said melting chamber (5) of a truncated cone shape extends from the point of contact of the plastic material in solid state (F) with the interior wall of the conical section to approximately said deposition outlet; and
e) at least two longitudinal profiles or ribs (10), located as a cone generator and angularly offset are protruding from said interior wall of the conical section corresponding to the melting chamber (5) area, having a multifaceted end (11) facing and opposed to an entrance to said melting chamber (5),
so that that said melting chamber (5) is located at the end part of the sonotrode itself (2).

2. The device according to claim 1, wherein said point of contact of the plastic material in solid state (F) with said internal wall of said frustum conical section is located at a distance of around 1 to 3 mm.

3. The device according to claim 1, wherein said melting chamber (5) includes four equally angularly spaced protruding profiles (10).

4. The device according to claim 1, wherein said multifaceted end (11) of said at least two longitudinal profiles (10) is a polyhedron.

5. The device according to claim 4, wherein said polyhedron is a pyramid with at least one edge directly opposite the entrance of the plastic material in solid state (F) to said melting chamber (5).

6. The device according to claim 1, wherein said at least two longitudinal profiles (10) end close to said deposition outlet (4a).

7. The device according to claim 1, wherein said internal channel (6) of said sonotrode (2) has a cross section within the range of 1 and 5 mm in diameter.

8. The device according to claim 1, wherein said nozzle (4) and said sonotrode (2) are connected by means of a thread, said thread connection being internal or external to the final part of the sonotrode.

9. The device according to claim 1, wherein said internal channel (6) extends along all of a length of the sonotrode (2).

10. The device according to claim 1, wherein said internal channel (6) extends along all of a length of all of an assembly of the ultrasonic transducer (1) and sonotrode (2).

11. The device according to claim 9, wherein said internal channel (6) is centered with regard to at least the length of the sonotrode.

12. The device according to claim 1, wherein the plastic material is fed by means of an impeller system in the form of a filament or pellets or alike through said internal channel (6).

13. The device according to claim 1, wherein said sonotrode (2) is monolithic and its material is selected among titanium, steel and aluminium and its alloys.

14. The device according to claim 1, wherein the material of the nozzle (4) is selected among aluminum, steel and titanium and their alloys.

15. The device according to claim 1, further comprising an arrangement for controlling the temperature of the sonotrode, said arrangement being internal or external, by reducing the temperature of the melting chamber.

* * * * *